United States Patent [19]
Mine et al.

[11] Patent Number: 5,653,480
[45] Date of Patent: Aug. 5, 1997

[54] PIPE COUPLING

[75] Inventors: Kenji Mine; Yasushi Kashima; Takahiro Yokomatsu; Kunihiro Tanaka; Kouichi Minagawa; Yoshiharu Nishimura, all of Tokyo, Japan

[73] Assignee: Bridgestone Flowtech Corporation, Tokyo, Japan

[21] Appl. No.: 529,126

[22] Filed: Sep. 15, 1995

Related U.S. Application Data

[63] Continuation-in-part of Ser. No. 210,522, Mar. 18, 1994, abandoned.

[30] Foreign Application Priority Data

Mar. 19, 1993 [JP] Japan .................. 5-85336
Jun. 28, 1995 [JP] Japan .................. 7-184886

[51] Int. Cl.$^6$ ............................................ F16L 21/06
[52] U.S. Cl. ..................... 285/322; 285/276; 285/382
[58] Field of Search ............................ 285/322, 323, 285/38, 382, 906, 276

[56] References Cited

U.S. PATENT DOCUMENTS

| | | | |
|---|---|---|---|
| 1,337,288 | 4/1920 | Stichler | 285/322 |
| 1,953,830 | 4/1934 | Park | 285/322 |
| 2,182,797 | 3/1939 | Dillion . | |
| 3,150,886 | 9/1964 | Briegel et al. | 285/322 |
| 4,304,426 | 12/1981 | Francis | 285/322 |
| 4,685,706 | 8/1987 | Kowal et al. | 285/322 |
| 5,172,943 | 12/1992 | Shimada | 285/323 |

FOREIGN PATENT DOCUMENTS

| | | | |
|---|---|---|---|
| A0156575 | 2/1985 | European Pat. Off. . | |
| A706393 | 4/1930 | France . | |
| 2573844 | 5/1986 | France | 285/323 |
| 2916900 | 11/1979 | Germany . | |
| U8121384.0 | 7/1981 | Germany . | |
| 61-8307 | 3/1986 | Japan . | |
| 62-194994 | 12/1987 | Japan . | |
| 51695 | 2/1990 | Japan | 285/322 |
| 3-265789 | 11/1991 | Japan | 285/322 |
| 4-105290 | 9/1992 | Japan . | |
| 5-14784 | 2/1993 | Japan . | |

Primary Examiner—Dave W. Arola
Attorney, Agent, or Firm—Robbins, Berliner & Carson, LLP

[57] ABSTRACT

A pipe coupling is constructed such that: a pressing member is supported by an inner collar and presses an inserted pipe body in a state in which the pressing member contacts an inclined surface of an outer collar; the inclined surface of the outer collar causes the pressing member to be moved in a radial direction thereof when the pressing member moves toward a deep portion within the pipe coupling, and restricts the movement of the pressing member in the radial direction when the pressing member moves in a direction of an exit; the inner collar is urged toward the exit by an elastic member; and the outer collar is relatively movably coupled to a housing of the pipe coupling. In the case of any type of rigid pipe body, the pipe coupling can be freely and easily connected to and removed from the same.

24 Claims, 15 Drawing Sheets

PIPE COUPLING

CONTINUITY

This is a continuation-in-part application of U.S. patent application Ser. No. 08/210,522 filed Mar. 18, 1994, now abandoned.

BACKGROUND OF THE INVENTION

1. Field of the Invention

The present invention relates to a pipe coupling for use in a pipe arrangement of a construction machine, a machine tool and the like, and particularly to a pipe coupling which is suitable for use in connecting and removing a pipe body in a small space where it is difficult to use a tool.

2. Description of the Related Art

For use with a pipe body which is made of relatively flexible synthetic resin or rubber, there has been proposed a pipe coupling which makes it possible to connect and remove a pipe body in a relatively simple manner.

However, when used with a relatively hard pipe body such as a polyvinyl chloride-coated hose, which is also made of synthetic resin as described above, or a metal pipe or the like, a pipe coupling which can be freely connected to and removed from such a hard pipe, has not been put to practical use.

FIG. 22 shows one example of this type of pipe coupling, which allows coupling by causing a bite piece 32 to bite a pipe body 40.

A cap nut 33 threadedly engaged with a female member 31 causes the bite piece 32 to be pressed against and to bite a surface of the pipe body 40. Thus, even if the cap nut 33 is loosened, the bite piece 32 is not easily separated from the pipe body 40, making it nearly impossible to remove the pipe body 40 from the pipe coupling. Further, if the pipe body 40 is removed from the pipe coupling, the surface of the pipe body 40 is damaged. For this reason, when the damaged pipe body 40 is re-used, there is a possibility that the fluid flowing through the pipe body 40 may leak out via the damaged portion thereof.

Therefore, a pipe coupling which is suitable for use with a metal pipe or the like and which can be freely connected to and removed from the metal pipe or the like, is not in practical use.

SUMMARY OF THE INVENTION

In view of the aforementioned, it is an object of the present invention to provide a pipe coupling for use with a pipe having a relatively high rigidity, such as a metal pipe, in which the pipe coupling can be connected to and removed from this kind of pipe in a simple manner.

Another object of the present invention is to provide a pipe coupling which is relatively rotatable with regard to a pipe body coupled to the pipe coupling when the pressure is applied thereto.

Still further object of the present invention is to provide a pipe coupling which is relatively movable and absorbs vibration and shock of the pipe body coupled to the pipe coupling.

Further object of the present invention is to provide a pipe coupling by which a deviation from the state in which the pipe coupling is perfectly coaxial with the pipe body is allowable, namely, even if the pipe coupling is not coaxial with the pipe body, the pipe coupling can still be placed on the tip of the pipe body by the relative movement of the pipe coupling with regard to the pipe body.

In accordance with the present invention, there is provided a pipe coupling which is comprised of a cylindrical female member; an outer collar which is cylindrical and which is formed so as to be movably fitted to the female member; an inner collar which is cylindrical and which is provided so as to move within the outer collar in an axial direction of the outer collar; a pressing member supported by the inner collar and provided so as to press an inserted pipe body, which the pressing member is formed into such a shape and made of such a material as to be dug in the surface of the pipe body when a strong force acts in a direction in which the pipe body is pulled out; movement-restricting means which generates a pressing force of the pressing member and restricts the movement of the inner collar; an elastic member provided within any one of the female member and the outer collar and urging the inner collar toward the exit; and coupling means to movably couple the outer collar with an end of the female member. Moreover, the outer collar is able to be rotatably mounted to the female member.

Preferably, a seal member, the elastic member and the pressing member supported by the inner collar are sequentially arranged at an inner peripheral surface of the female member from the side of a deep portion, i.e., the portion, within the female member, which a leading end of an inserted pipe body makes contact. Further, in order that the inner collar may be moved from the outside, preferably, a leading end of the inner collar projects out from a leading end of the outer collar.

Generally, a hard ball is employed as the above-described pressing member. Further, it is preferable that a stepped portion which abuts against a leading end of an inserted pipe body is formed in the deep portion of the female member. The female member and the outer collar are relatively movably coupled each other so that the pipe coupling can still be placed on the tip of the pipe body the relative movement of the outer collar with regard to the female member even if the pipe coupling is not coaxial with the pipe body. In addition, the pipe coupling absorbs vibration and shock applied to the pipe body coupled to the pipe coupling due to the relative movement of the pipe coupling and the position of the pipe coupling can be adjusted.

As an elastic member used in the present invention, a coil spring, a disc spring, a cylindrical rubber elastic member and the like may be employed.

The inner collar and the outer collar are each made of synthetic resin or metal. Particularly, in the outer collar, a tapered hole of which the diameter is large at the side of an inner portion of the outer collar is formed by punching, and the pressing member such as a ball is inserted into the tapered hole. When the inner collar is made of synthetic resin, a ball is set in a mold for molding the inner collar. The ball, i.e., the pressing member, may be embedded in the molded inner collar.

Since the present invention is constructed in the above-described manner, it becomes very easy to connect and remove a pipe body having a high hardness.

Connection between the pipe coupling of the present invention and a pipe body such as a metal pipe is effected by inserting the pipe body from the leading end of the inner collar of the female member. This is due to the pressing member, for example, a ball which is embedded in the inner collar, contacting the outer peripheral surface of the pipe body. The ball, together with the inner collar, is pushed toward the leading end of the inner collar by the elastic member. Meanwhile, this ball contacts the inclined surface of the outer collar and the pressing force of the ball is directed toward the surface of the pipe body. As a result, the connection between the pipe coupling and the pipe body is maintained.

On the other hand, an operation for removing the pipe body from the pipe coupling is performed as described below.

In the state in which the pipe coupling and the pipe body are connected to each other as described above, the leading end of the inner collar is pushed toward the deep portion of the female member, so that the ball which contacts the inclined surface of the outer collar is moved together with the inner collar toward the inward direction.

For this reason, the ball is released from the state in which the ball contacts the outer collar, and the pressing force of the ball, to be applied to the surface of the pipe body, is released. By pulling the pipe body out of the pipe coupling while maintaining the above-described state, the pipe body can be easily removed from the pipe coupling.

Then, when a force for pressing the inner collar is lessened after the pipe body is removed, the inner collar is pushed back to the original state by the elastic member. In this way, each operation of connecting and removing the pipe body is effected repeatedly.

Since the pipe coupling of the present invention has the above-described structure, even if a pipe body has a high hardness, it is possible to freely connect and remove the pipe body. In particular, in a small space, it becomes easy to connect and remove the pipe body. As a result, a remarkably great effect is obtained in the industrial field.

In the present invention, the outer collar and the female member are formed to be relatively movable and/or the outer collar is rotatable in the peripheral direction, and further, the outer collar can be slightly eccentric due to transverse deviation of the engagement position. As a result, even if the pipe body is slightly eccentric with respect to the pipe coupling, the engagement and detachment of the pipe body and the pipe coupling can be effected easily. Further, because the outer collar is movable and/or rotatable in the peripheral direction, the movement and/or rotation of the outer collar can follow vibration and rotation of the pipe body so that excessive forces are absorbed and the durability of the pipe coupling improves markedly.

DESCRIPTION OF THE PREFERRED EMBODIMENTS

A description of a pipe coupling of the present invention will be described hereafter.

Figure 1:
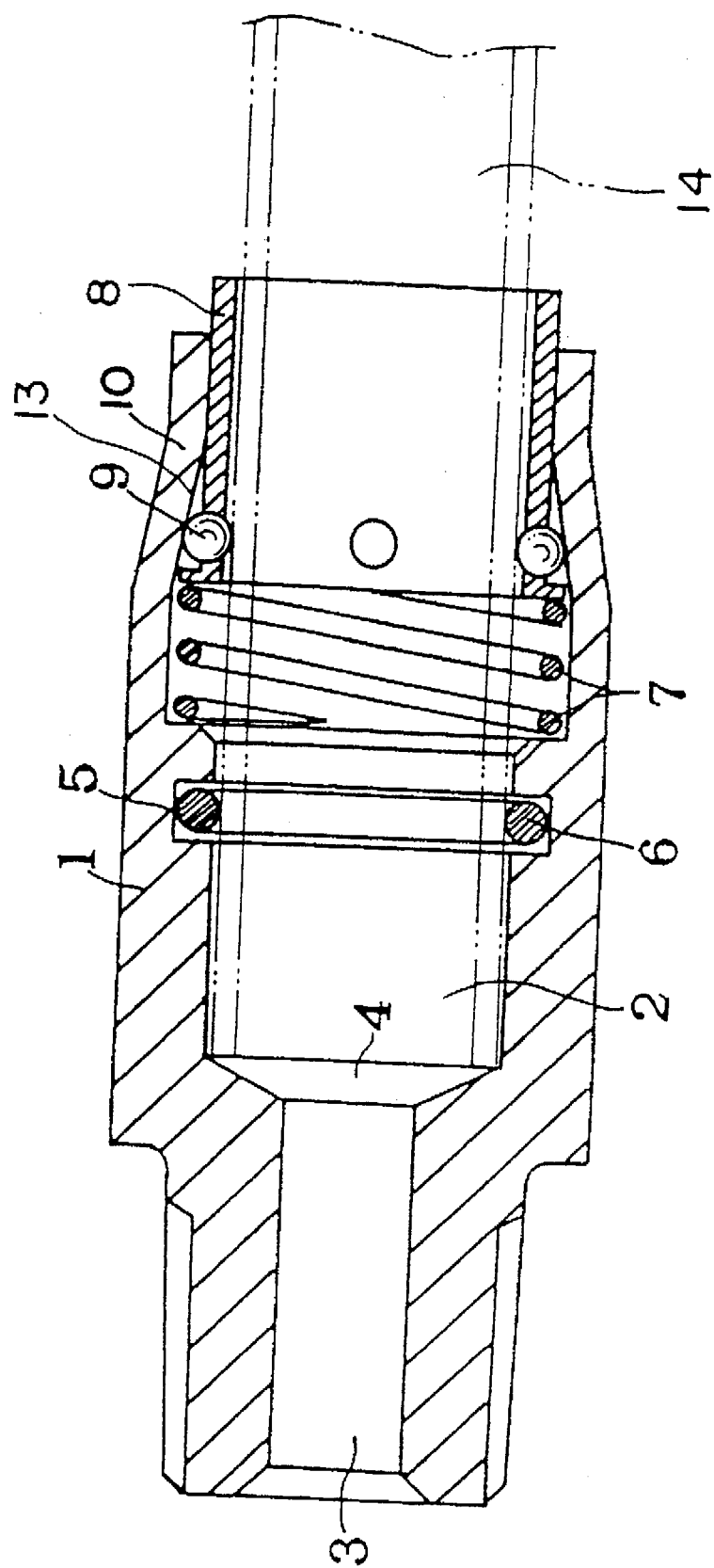
FIG. 1 is a cross-sectional view illustrating a pipe coupling according to a first embodiment of the present invention.

FIG. 1 is a cross-sectional view illustrating a pipe coupling according to a first embodiment of the present invention.

A female member 1 which forms a base body of the pipe coupling is provided with a through hole 2 having a large diameter, and a through hole 3 having a small diameter. A stepped portion 4 is formed between these through holes 2 and 3. Next, the through hole 2 is provided with a groove 5 near a leading end thereof, and a seal member 6 such as an O ring is fitted into the groove 5. A coil spring 7 is disposed further toward an exit than the seal member 6, and an inner collar 8 made of synthetic resin, together with a pressing member, i.e., a ball 9, is disposed even further toward the exit than the coil spring 7. The coil spring 7, the inner collar 8 and the ball 9 are all covered by an outer collar 10. The collar 10 extends from and is formed integrally with the female member 1, and a leading end of the collar 10 is reduced in diameter. Alternatively, a separate outer collar may be fixed to the female member 1 by brazing or may be screwed thereto. In the case of the outer collar 10 being screwed to the female member 1, the position of the outer collar 10 can be adjusted in accordance with the degree to which the outer collar 10 and the female member 1 are screwed together.

Figure 2:
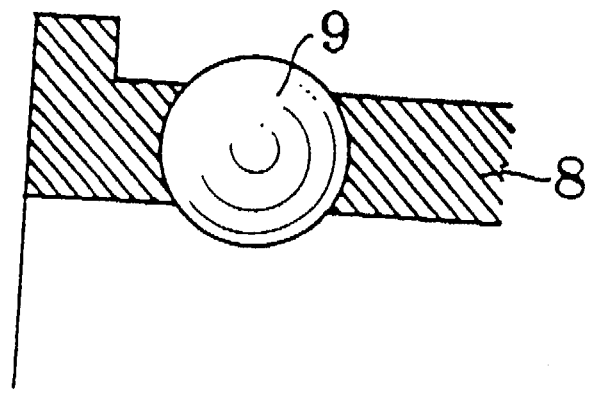
FIG. 2 is a partial cross-sectional view illustrating the relationship between an inner collar and a ball.

The relationship between the inner collar 8 and the ball 9 is such that the ball 9 is fitted into the inner collar 8 as illustrated in FIG. 2. This structure is formed by setting the ball 9 into a mold at the time of molding the inner collar 8 so that the ball 9 can be fitted into the inner collar 8.

In this case, preferably, a crack may be formed in the inner collar 8 at a leading end thereof.

Figure 3:
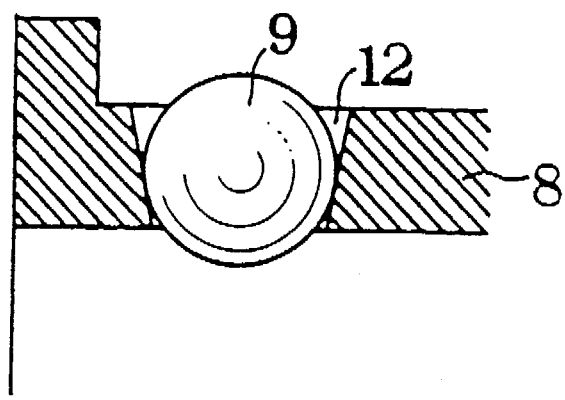
FIG. 3 is a partial cross-sectional view of another example illustrating the relationship between the inner collar and the ball.

FIG. 3 illustrates a modified example of the relationship between the inner collar 8 and the ball 9. In this structure a tapered hole 12 is formed in the inner collar 8, and the ball 9 is fitted into the hole 12 from an outer peripheral side of the inner collar 8.

Returning to FIG. 1, the outer collar 10 has an inclined surface 13 with respect to the above-described ball 9. The inclined surface 13 is formed such that the diameter thereof at the side of a deep portion, i.e., the portion, within the female member 1, with which a leading end of an inserted pipe body makes contact, is large. The inclined surface 13 causes the movement of the ball 9 to be restricted, and causes a contact force of the ball 9 with respect to a pipe body to be exhibited.

Against the stepped portion 4 provided in the deep portion within the female member 1, a leading end of an inserted pipe body is brought into abutment. Thus, if the leading end of the pipe body abuts against the stepped portion 4, it can be determined that the pipe body has been completely inserted.

FIG. 1 illustrates the state in Which a pipe body 14 indicated by the dotted lines is inserted into the inner collar 8. The position of the pipe body 14 is determined by causing the leading end thereof to abut against the stepped portion 4. Here, when force is applied from the outside in order to pull out the pipe body 14 from the state shown in FIG. 1, or when a fluid flows into the pipe body 14 in the state shown therein, namely, when a force acts in a direction in which the pipe body 14 is pulled out, the ball 9 is pushed against the inclined surface 13 of the outer collar 10 by the coil spring 7. At the same time, the inclined surface 13 of the outer collar 10 causes the ball 9 to press the surface of the pipe body 14. As a result, the pulling of the pipe body 14 out of the pipe coupling is prevented. When the pipe body 14 is about to be pulled out by a stronger force, or when the pressure within the pipe body 14 becomes high, the ball 9 is pressed strongly by the inclined surface 13 of the outer collar 10 and strongly presses the surface of the pipe body 14. As a result, the ball 9 may be dug in the surface of the pipe body 14 such that the pipe body 14 can be firmly held by the ball 9. The ball 9 is made 0f any material whose hardness is larger than that of the pipe body 14.

On the other hand, when the pipe body 14 is removed from the pipe coupling, a leading end 8A of the above-described inner collar 8, which projects out from the leading end of the outer collar 10, is used. Namely, the pipe body 14 can be pulled out by pushing the leading end 8A of the inner collar 8 in the direction of the female member 1. In other words, the inner collar 8 can be moved in the direction of the female member 1 by pushing the projected portion of the inner collar 8, thereby causing a pressing force of the ball 9 to be released.

Figure 4:
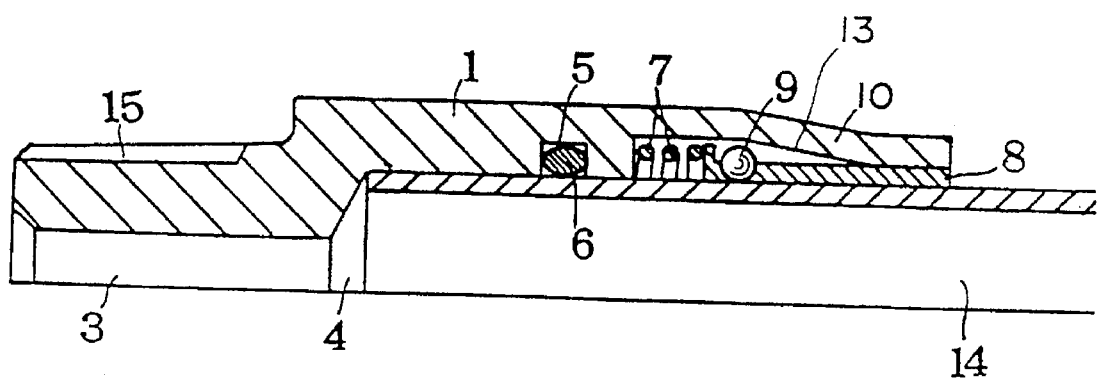
FIG. 4 is a partial cross-sectional view illustrating a state in which a pipe body is pulled out from the pipe coupling of the present invention.

The above-described state is shown in FIG. 4 in which the inner collar 8 is moved toward the side of the female member 1, so that the ball 9, together with the inner collar 8, also moves toward the side of the female member 1. This means that the state in which the ball 9 contacts the inclined surface 13 of the outer collar 10 is released. For this reason, the pressing force of the ball 9, which is applied to the surface of the pipe body 14, is released. Accordingly, the pipe body 14 does not receive the pressing force of the ball 9 so as to be easily pulled out of the female member 1.

In FIG. 4, the female member 1 is provided with a male screw 15 at the side of the through hole 3. The male screw 15 is connected to an illustrated pipe body or the like.

Meanwhile, by providing the above-described structure at the side of the through hole 3 of the female member 1 (not shown), a pipe coupling is obtained which can be connected to and removed from any pipe body.

Further, as the seal member 6, an O ring of which the cross-sectional configuration is circular, is shown herein. However, the present invention is not limited to the same, and any seal member, for example, a cross-section thereof is an L-shaped or X-shaped configuration, may be applied.

Moreover, the relationship between the inner collar 8 and the outer collar 10 does not always need to be set such that the inner collar 8 projects out from the outer collar 10, and it suffices that the inner collar 8 can be moved toward the side of the female member 1 from the outside.

Figure 5:
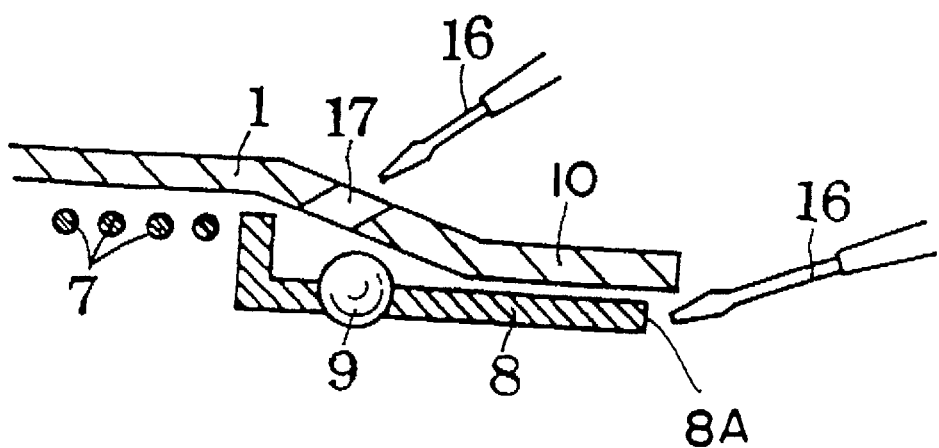
FIG. 5 is a partial cross-sectional view of a modified example illustrating the relationship between the inner collar and an outer collar.
Figure 6:
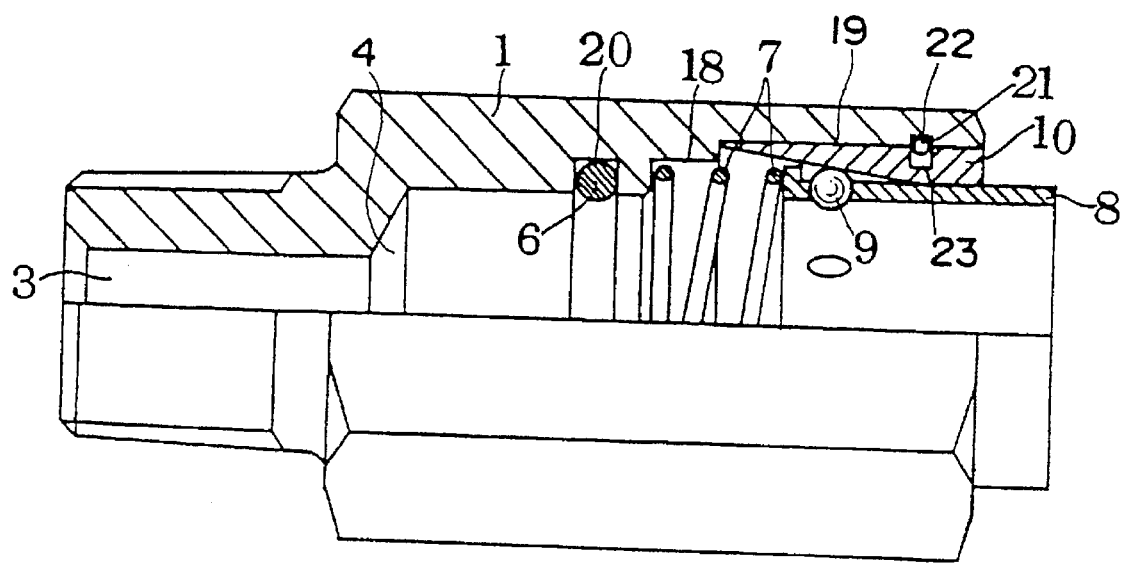
FIG. 6 is a view illustrating a cross-section of one-half of a pipe coupling according to a second embodiment of the present invention.

FIG. 5 is a partial cross-sectional view illustrating the example as described above. It suffices that, although the leading end 8A of the inner collar 8 does not project out from the outer collar 10, the leading end 8A of the inner collar 8 can be pushed by a screw driver 16 or the like. In addition, a small hole 17 is formed in the outer collar 10, and the screwdriver 16 or the like is pushed into the small hole 17, thereby causing the inner collar 8 to be moved toward the side of the female member 1.

Figure 8:
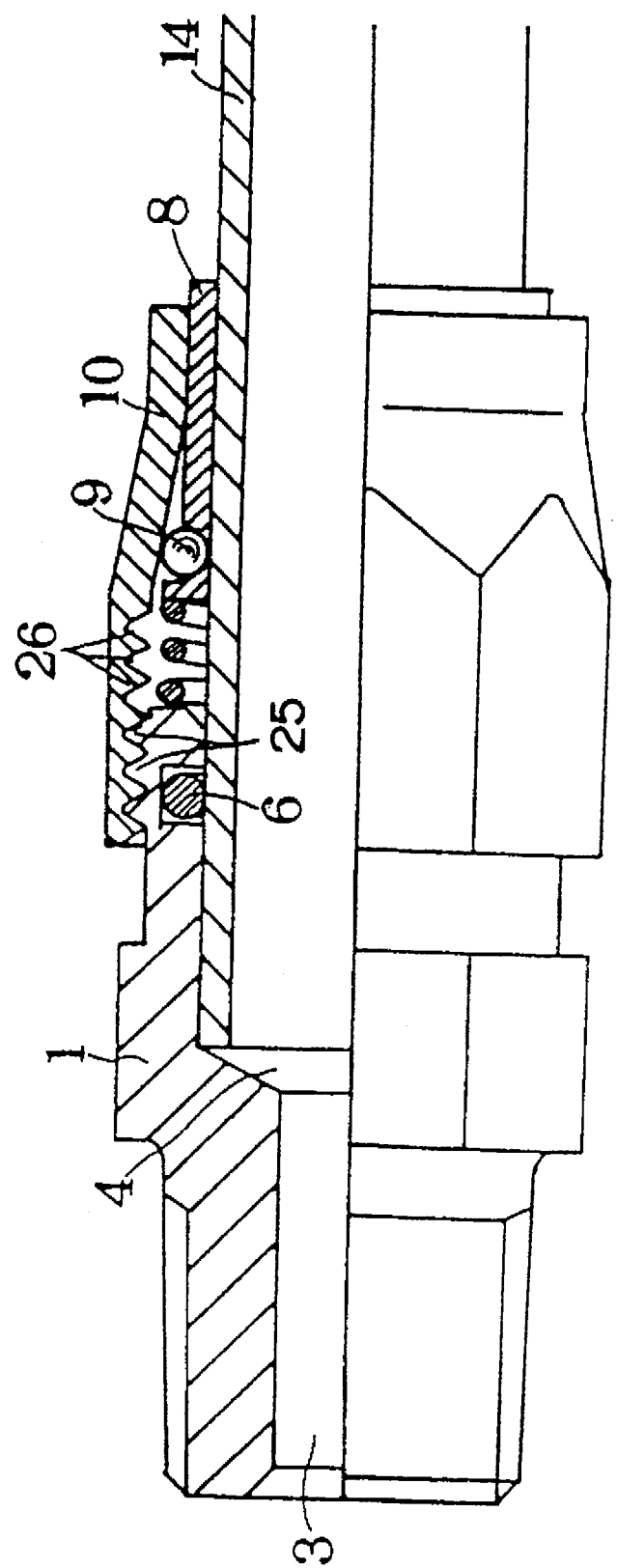
FIG. 8 is a view illustrating a cross-section of one-half of a pipe coupling according to a fourth embodiment of the present invention.

FIG. 8 is a view illustrating a cross-section of one-half of a pipe coupling according to a second embodiment of the present invention. In this embodiment, an inner peripheral surface of the female member 1 is formed by a plurality of stepped portions. Namely, the coil spring 7 is fitted into a second stepped portion 18, and the outer collar 10 is fitted into a third stepped portion 19. Then, an O ring 6 is fitted into a groove 20 formed in the inner peripheral surface of the female member 1. In addition, an engaging member (a stop ring) 21 is fitted into a groove 22 formed in the inner peripheral surface of the third stepped portion 19 of the female member 1 and a groove 23 formed in the outer collar 10. As a result, the relative movement of the female member 1 and the outer collar 10 in their axial directions is prevented.

Each operation of connecting and removing the pipe body can be effected in the same way as the first embodiment.

Figure 7:
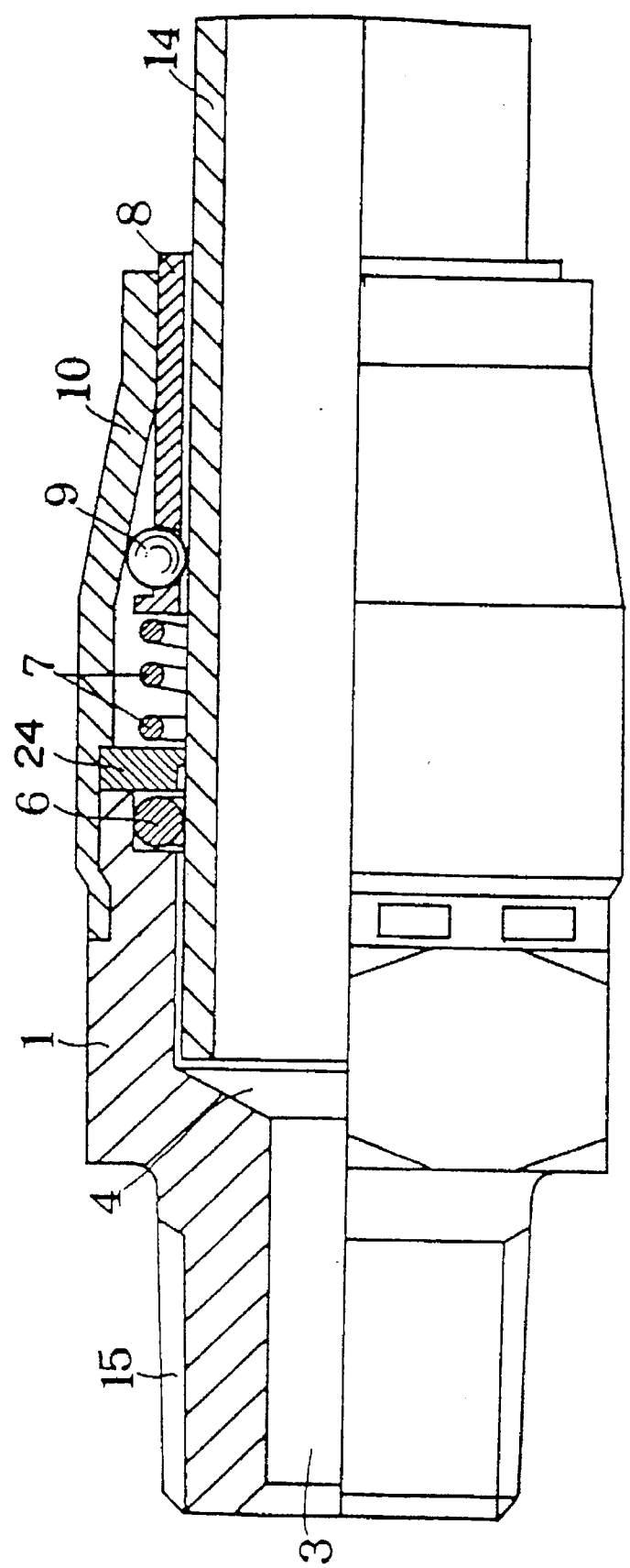
FIG. 7 is a view illustrating a cross-section of one-half of a pipe coupling according to a third embodiment of the present invention.

FIG. 7 is a view illustrating a cross-section of one-half of a pipe coupling according to a third embodiment of the present invention. In this embodiment, the seal member 6 located at the inner peripheral surface of the female member 1 is supported by a washer 24 against the seal member 6.

Each operation of connecting and removing the pipe body can be effected in the same way as the first embodiment.

FIG. 8 is a view illustrating a cross-section of one-half of a pipe coupling according to a fourth embodiment of the present invention. In this embodiment, the female member 1 and the outer collar 10 are threadedly engaged with each other. Other structures are similar to those of the first embodiment. Namely, the female member 1 and the outer collar 10 are screwed together by means of a male screw 25 of the female member 1 and a female screw 26 of the outer collar 10. The position where the inclined portion 13 of the outer collar 10 and the ball 9 contact each other can be adjusted in accordance with the degree to which the female member 1 and the outer collar 10 are screwed together.

Further, each operation of connecting and removing the pipe body can be effected in the same way as the first embodiment.

The present invention was developed in order to carry out the absorption of vibrations when the pipe coupling is used and to address the rotational force of the pipe body, and provides a pipe coupling in which an elastic body and an inner collar which supports a pressure member are disposed in order from a deep portion toward a leading end of a female end along a passage of a female member which is the base member of the pipe coupling. An outer collar which extends from the female member covers those elements of the elastic body, the inner collar and the pressure member. A tapered portion, whose deep portion side has an enlarged diameter is formed at the tip end of an outer collar, wherein the outer collar and the female member are provided separately, and the outer collar and the female member are engaged so that the outer collar is rotatable in the peripheral direction in relation to the female member. It is not particularly necessary for the female member and the outer collar to be engaged by sealing, and the engagement surfaces may be engaged by, for example, a retaining ring, a hard ball, caulking, or the like.

Figure 9:
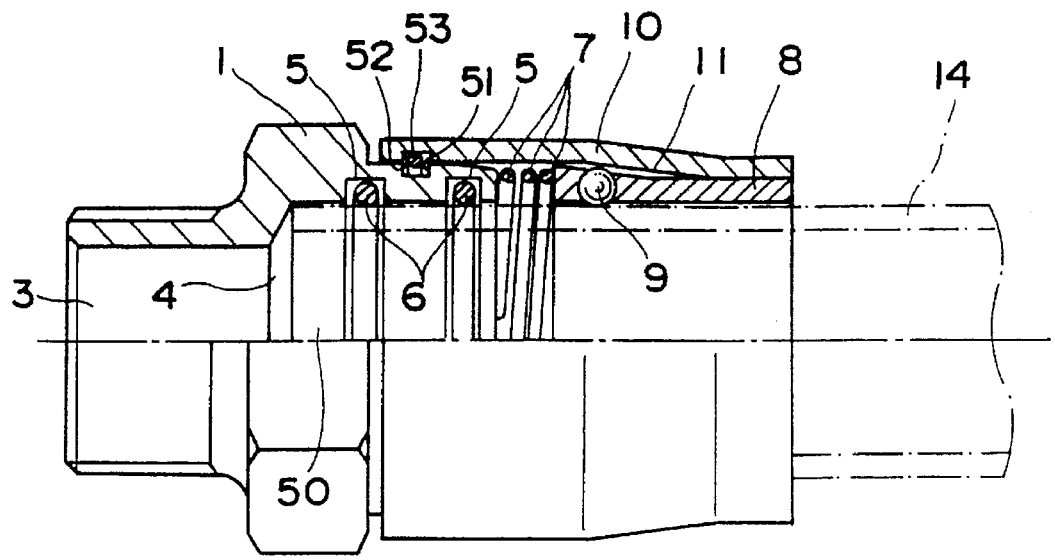
FIG. 9 is a partial cross-sectional view illustrating a pipe coupling according to a fifth embodiment of the present invention.

FIG. 9 is a half-cut cross-sectional view of a fifth embodiment of the pipe coupling. In the drawings, 1 is the female member which is the base member for the pipe coupling. The passage of a large diameter portion 50 is formed to the right of a stepped portion 4, and the passage of a small diameter portion 3 is formed to the left of the stepped portion 4. Two annular grooves 5, 5 are formed in the inner surface of the large diameter portion 50, and O-rings 6, 6 are fit into the annular grooves 5, 5. A coil spring 7 and an inner collar 8 made of synthetic resin are disposed together with a ball 9 at the edge of the large diameter portion 50. All of these components are covered by an outer collar 10. This outer collar 10 is fit over the outer peripheral surface of the large diameter portion 50 of the female member 1. The diameter of the leading end of the outer collar 10 is small such that a tapered portion 11 is formed.

The stepped portion 4 provided at the deep portion of the female member 1 is abutted by the leading end of an inserted pipe body 14. Whether the pipe body 14 has been completely inserted can be confirmed by whether the leading end of the pipe body 14 has hit the stepped portion 4.

Figure 10:
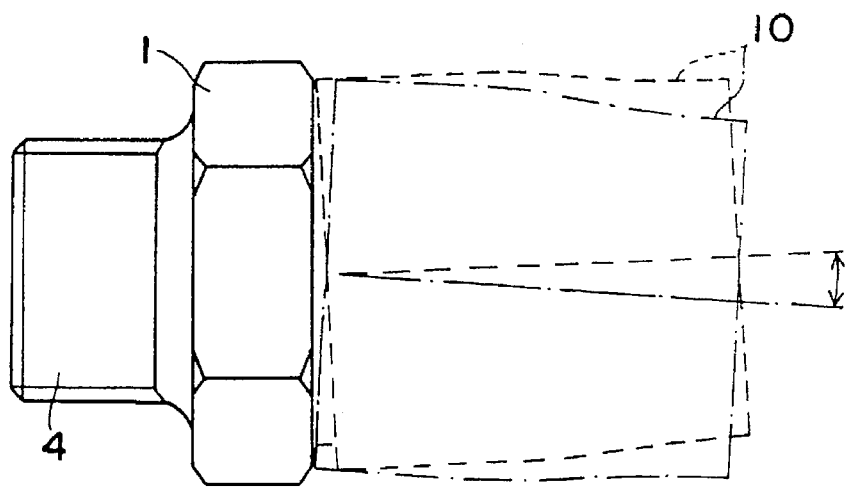
FIG. 10 is a schematic side view of the pipe coupling shown in FIG. 9.

Any of various engaging means may be used for the engagement of the outer peripheral surface of the large diameter portion 50 and the outer collar 10. However, in the figure, an annular groove 51 is formed in the outer peripheral surface of the large diameter portion 50 and an annular groove 52 is formed in the inner peripheral surface of the outer collar 10. An engaging member 53 is fit therebetween so as to engage the large diameter portion 50 and the outer collar 10. Accordingly, the outer collar 10 is rotatable in the peripheral direction with respect to the large diameter portion 50 of the female member 1, and as shown by the dotted line in FIG. 10, the outer collar 10 may be slightly eccentric with respect to the female member 1.

In the drawings, the diameter of the outer edge of the leading end of the large diameter portion 50 is made slightly smaller. Therefore, the attachment of the outer collar 10 to the large diameter portion 50 is easy, and after attachment, eccentric movement of the outer collar 10 is smooth.

Figure 11:
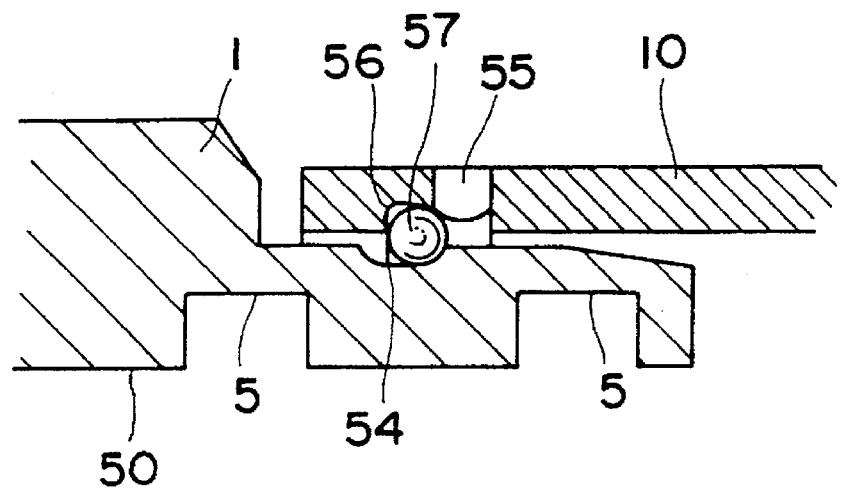
FIG. 11 is a cross-sectional view of a pipe coupling illustrating a pipe coupling according to a sixth embodiment of the present invention.
Figure 12:
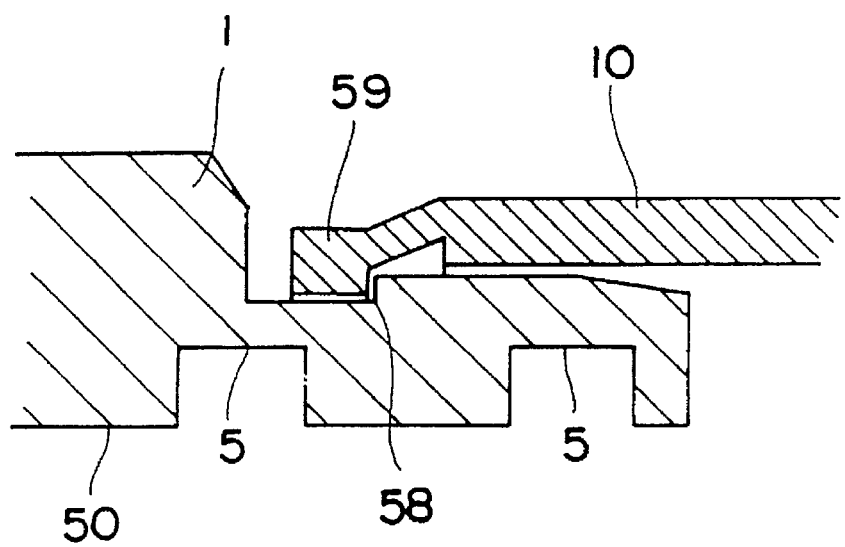
FIG. 12 is a cross-sectional view of a pipe coupling illustrating a pipe coupling according to a seventh embodiment of the present invention.

FIG. 11 illustrates a sixth embodiment of the pipe coupling of the present invention, and is an enlarged view of the engagement portion of the large diameter portion 50 and the outer collar 10 in particular. In this embodiment, an annular groove 54 is formed in the outer peripheral surface of the large diameter portion 50. A hole 55 and an annular groove 56 communicating with the hole 55 are formed in the outer collar 10. A ball 57 is inserted from this hole 55 so as to provide a means of engaging the outer collar 10 and the large diameter portion FIG. 12 illustrates a seventh embodiment of the pipe coupling of the present invention, and is an enlarged view of the engagement portion of the large diameter portion 50 and the outer collar 10 in particular. In this embodiment, an annular stepped portion 58 is formed in the surface of the large diameter portion 50. An inner tip end 59 of the outer collar 10 is engaged with the annular stepped portion 58 by caulking. In place of the annular stepped portion 58, an annular projection which is not illustrated may be used to engage with the inner tip end 29 of the outer collar 10.

The above explanation describes in detail structures in which the outer collar 10 covers the outer peripheral surface of the large diameter portion 50 of the female member 1. However, the present invention is not limited to the same.

Figure 13:
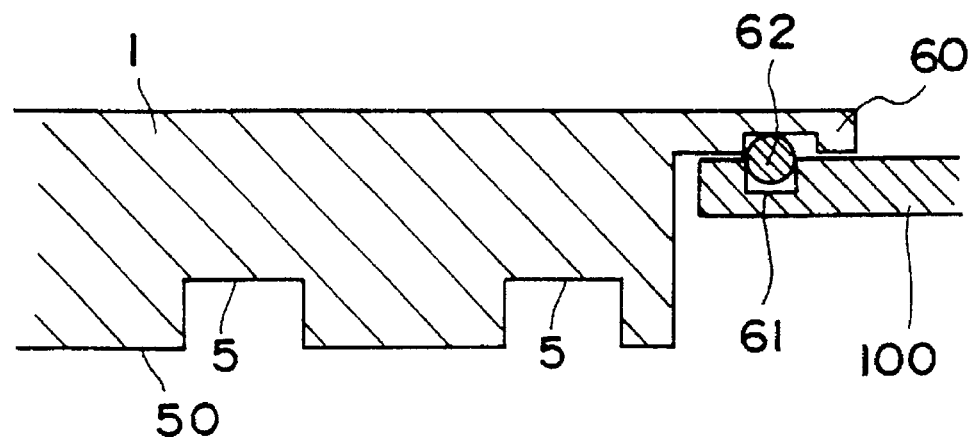
FIG. 13 is a cross-sectional view of a pipe coupling illustrating a pipe coupling according to a eight embodiment of the present invention.

As shown in FIG. 13 which illustrates an eighth embodiment of the present invention, the large diameter portion 50 and the outer collar 10 are fit together oppositely (i.e., an outer peripheral end portion of the outer collar 10 is fit to an inner peripheral portion of the large diameter portion 50 of the female member 1). Here, any of the above-described engaging means may be used at the surfaces which fit together. In FIG. 13, the outer collar 10 is covered by the leading end of the large diameter portion 50. As in the structure illustrated in FIG. 13 annular grooves 60, 61 are provided therebetween, and an engaging member 62 is fit between the annular grooves 60, 61 so as to engage the outer collar 10 and the large diameter portion 50.

In all of the above-described structures, the large diameter portion 50 of the female member 1 and the outer collar 10 are formed separately. Furthermore, because the outer collar 10 is swingable and is rotatable in the peripheral direction, the insertion of the pipe body 14 into the inner collar 8 is extremely easy, and desirable results can be achieved when the structure is put to use.

Figure 14:
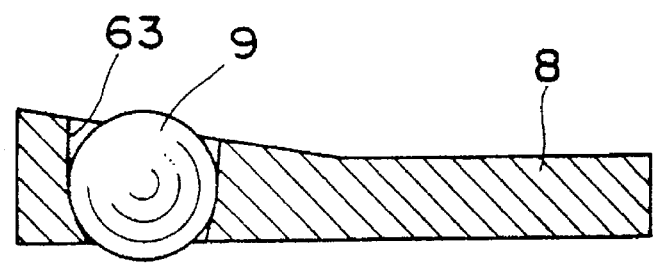
FIG. 14 is a partial cross-sectional view of another example illustrating the relationship between an inner collar and the ball of the present invention.

FIG. 14 is a cross-sectional view illustrating the relation between the inner collar 8 and the ball 9. A tapered hole 63 is formed in the inner collar 8 in a vicinity of the inclined outer peripheral end portion thereof. The ball 9 is fit into the tapered hole 63.

Figure 15:
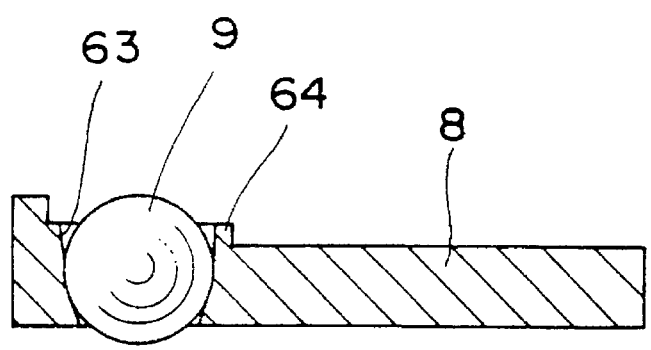
FIG. 15 is a partial cross-sectional view of another example illustrating the relationship between an inner collar and the ball of the present invention.

FIG. 15 is a cross-sectional view of a modified example of the structure illustrated in FIG. 14. In this modified example, the tapered hole 63 is formed in a stepped portion 64 of the thick end portion of inner collar 8, and the ball 9 is fit into the tapered hole 63.

The engagement and separation of the pipe coupling and the pipe body in the embodiment illustrated in FIG. 9 will be described in further detail hereinafter. In FIG. 9, when the pipe body 14 is inserted into the inner collar 8, the leading end of the pipe body 14 abuts the stepped portion 4, so that the position of the pipe body 14 is fixed. Here, when force for pulling out the pipe body 14 from this state is applied or when fluid flows within the pipe body 14 in this state (i.e., when force acts in the direction of pulling out the pipe body 14), the ball 9 is pushed against the tapered portion 11 side of the outer collar 10 due to the elastic force of the coil spring 7, and the ball 9 pushes the surface of the pipe body 14 due to the tapered portion 11 of the outer collar 10. The withdrawal of the pipe body 40 from the pipe coupling is thereby prevented.

When the pipe body 14 is to be removed from the pipe coupling, the leading end 8A of the inner collar 8 which projects out further than the leading end of the outer collar 10 is used. By pushing the leading end 8A of the inner collar 8, the inner collar 8 is moved toward the female member 1. The ball 9 is thereby moved, and the fastening force caused by contact with the tapered surface 11 is canceled. The pipe body 14 can thereby be easily removed from the female member 1. Namely, the pipe body 14 is removed by pushing the leading end 8A of the inner collar 8 in the direction of the female member 1.

It is not always necessary for the leading end 8A of the inner collar 8 to project out further than the leading end of the outer collar 10, and the inner collar 8 may be moved toward the female member 1 from the exterior. FIG. 5 is a partial cross-sectional view illustrating such an example. Even if the leading end 8A of the inner collar 8 does not project further than the outer collar 10, the leading end 8A may be pushed by a driver 24 or the like. Alternatively, a small hole 17 may be formed in the outer collar 10. The driver 24 or the like may be pushed into the small hole 17 so as to move the inner collar 8 in the direction of the female member 1.

Figure 16:
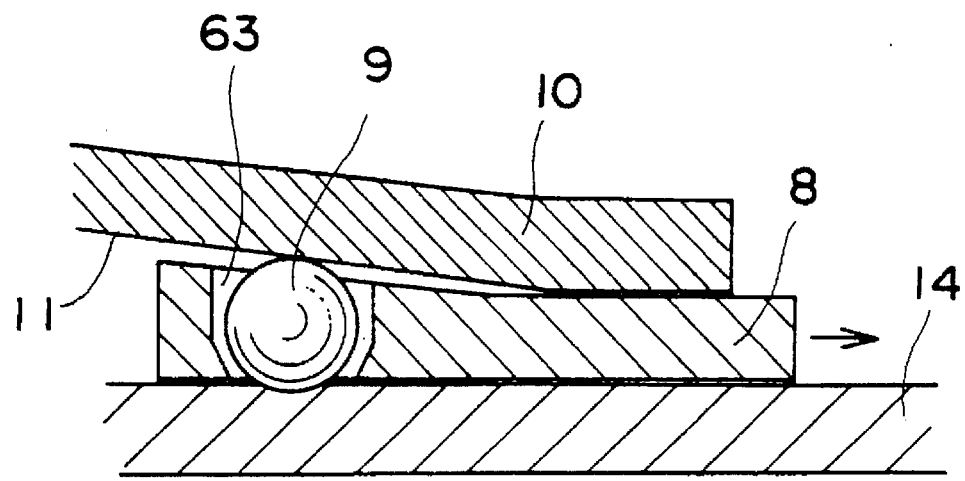
FIG. 16 is a partial cross-sectional view illustrating a status of using the inner and outer collars, the ball and the pipe body.
Figure 17:
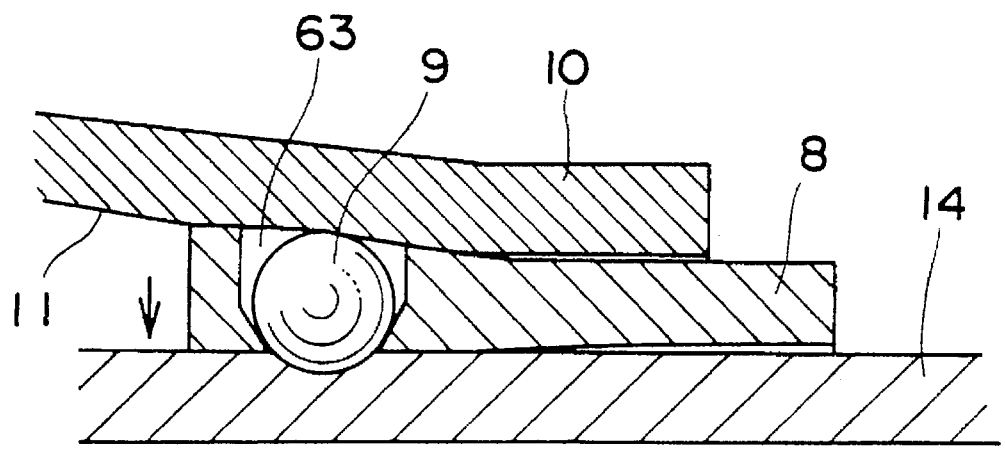
FIG. 17 is a partial cross-sectional view illustrating a status of using the inner and outer collars and the ball engaged with the pipe body by applying pressure to the ball.

The ball 9 is pushed toward the pipe body 14 in the radial direction by the tapered portion 11 of the outer collar 10, so that the ball 9 digs into the outer surface of the pipe coupling 14 as illustrated in FIG. 16. In a case in which an even larger pressure or pulling force is applied, the inner collar 8 follows the movement of the ball 9 and the pipe body 14 and moves toward the small diameter side of the outer collar 10 i.e., moves in the direction of the arrow in FIG. 16. Therefore, the large diameter portion of the inner collar 8 is pushed toward the pipe body 14 by the tapered portion 11 of the outer collar 10 in the direction of the arrow in FIG. 17, and the pipe body 14 is held even more strongly as illustrated in FIG. 17.

Figure 18:
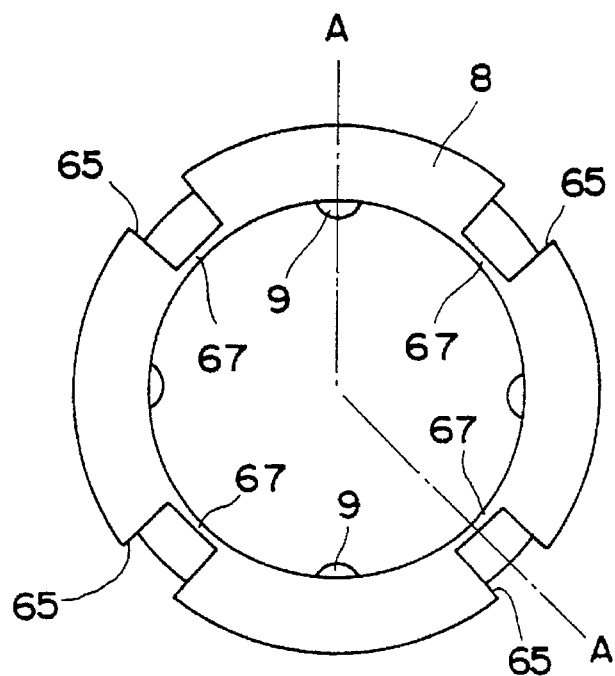
FIG. 18 is a front view of a modified inner collar having thin wall portions of the present invention.
Figure 19:
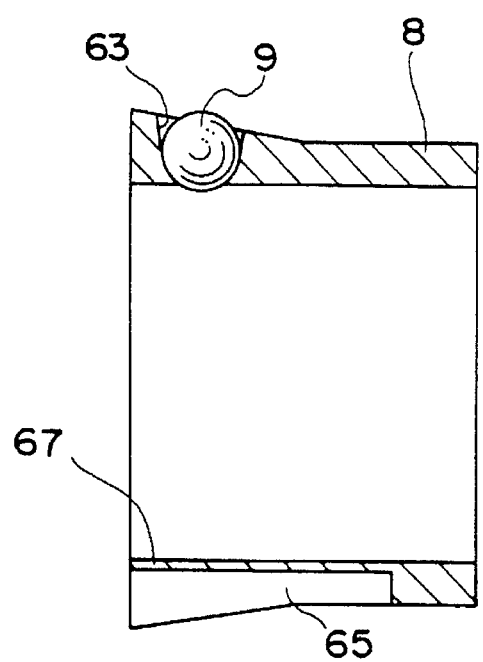
FIG. 19 is a cross-sectional view taken along lines A—A shown in FIG. 18.
Figure 20:
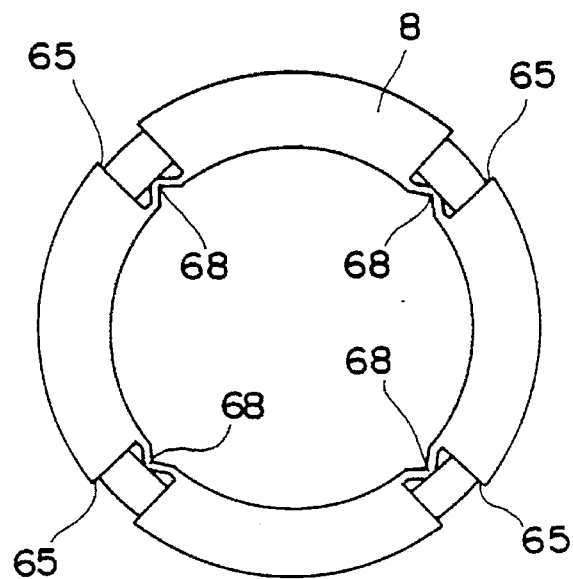
FIG. 20 is a front view of the inner collar illustrating an end face thereof and showing a status of the thin wall portions transformed by applying the pressure to the inner collar shown in FIG. 18.
Figure 21:
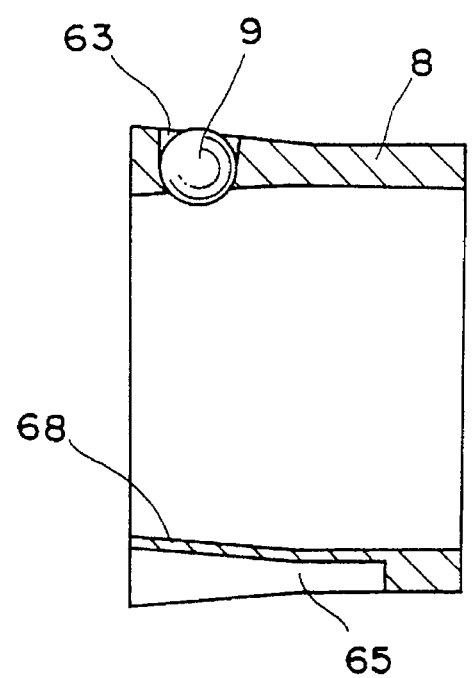
FIG. 21 is a cross-sectional view illustrating a status of transformation of the thin wall portions of the inner collar shown in FIG. 20, and corresponding to the view shown in FIG. 19.
Figure 22:
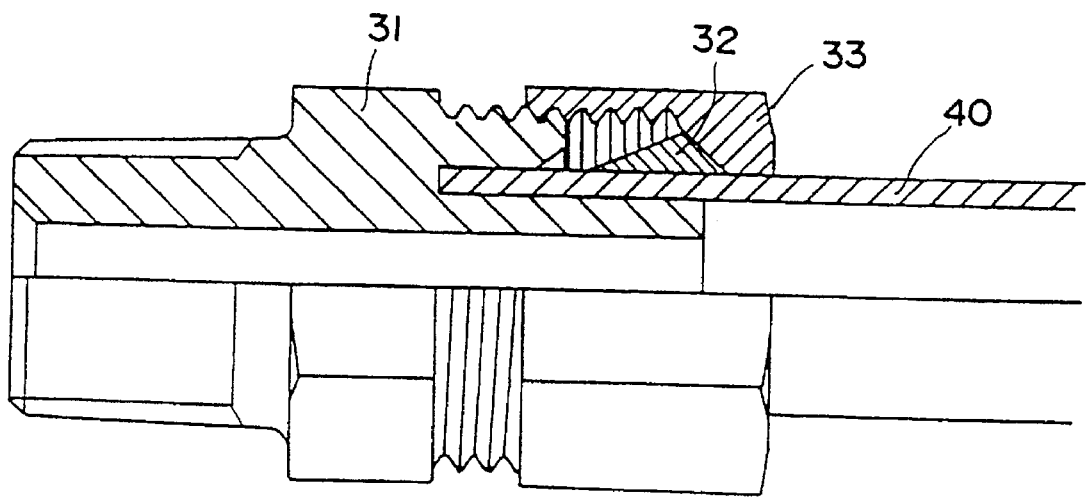
FIG. 22 is a partial cross-sectional view of a conventional pipe coupling.

FIG. 18 is a front view of the inner collar 8 which is particularly effective in the present invention. FIG. 19 is a cross-sectional view taken along line A—A of FIG. 18. This inner collar 8 supports the ball 9, and four longitudinal grooves 65 are formed in the outer surface of the inner collar 8 to provide a transformable wall portion. The portions of the inner collar 8 at these longitudinal grooves 65 are formed as thin wall portions 67. FIGS. 20 and 21 are a front view and a cross-sectional view of the inner collar 8 in a state in which a large pressure or pulling-out force is applied to the inner collar 8 illustrated in FIGS. 18 and 17. In this case, the thin wall portions 67 formed by the longitudinal grooves 65 bend radially and outwardly so as to become transformed portions 68, and contraction of the diameter of the inner collar 8 is thereby facilitated. In a coupling utilizing an inner collar having this type of structure, the force for preventing withdrawal is about 1.5 to 2 times greater than a coupling utilizing only a pushing member and a ball.

The longitudinal grooves 65 of the inner collar 8 may be formed as complete slits to provide a transformable wall portion so that the thin wall portions 67 is not provided. However, it is preferable that the thin wall portions 67 remain so that the inner collar 8 does not deform before the pipe body 14 is inserted.

The features of the present invention are that the outer collar and the female member are formed as separate members, the outer collar is rotatable in the peripheral direction, and further, the outer collar can be slightly eccentric due to transverse deviation of the engagement position. As a result, even if the pipe body is slightly eccentric with respect to the pipe coupling, the engagement and detachment of the pipe body and the pipe coupling can be effected easily. Further, because the outer collar is movable and/or rotatable in the peripheral direction, the movement and/or rotation of the outer collar can follow vibration and rotation of the pipe body so that excessive forces are absorbed and the durability of the pipe coupling improves markedly.

Further, the above-described structure of the present invention provides superior effects in that, even if the pipe body is hard, the joining and removal thereof can be carried out freely, and attachment and removal in small areas is facilitated.

In the first to fourth embodiments shown in FIGS. 1, 4, 7 to 8, the outer collar 10 is integrally provided with the female member 1 or is fixedly secured to the female member 1. It is noted that in those embodiments, an additional collar which is not shown in the drawings but has the same structure and function of the outer collar 10 shown in the drawings of FIGS. 9 to 21 is movably or rotatably mounted to the leading end portion of the outer collar 10 used in the first to fourth embodiments.

Although particular embodiments of the present invention have been illustrated and described, it will be apparent to those skilled in the art that various changes and modification can be made without departing from the spirit of the present invention. It is therefore intended to cover in appended claims all such changes and modifications that fall within the scope of the present invention.

What is claimed is:

1. A pipe coupling comprising:

a cylindrical female member;

an outer collar which is cylindrical and which is formed so as to be movably fitted to said female member;

an inner collar which is cylindrical and which is provided so as to move within said outer collar in an axial direction of said outer collar;

a pressing member supported by said inner collar so as to press an inserted pipe body, which said pressing member is formed into such a shape and made of such a material as to be dug in the surface of said pipe body when a strong force acts in a direction in which said pipe body is pulled out;

movement-restricting means which generates a pressing force of said pressing member and restricts the movement of said inner collar;

an urging member disposed between said female member and said inner collar and urging said inner collar toward the exit; and coupling means for movably coupling said outer collar with an end of said female member, said coupling means being comprised of an annular groove formed in one of an outer peripheral surface and an inner peripheral surface of said female member, an annular groove formed in one of an outer peripheral surface and an inner peripheral surface of said outer collar so as to substantially oppose said annular groove of said female member such that an annular space is formed by said both annular grooves, and an engaging member disposed in said annular space to movably couple said outer collar with said female member and to prevent said outer collar from falling off from said female member.

2. A pipe coupling according to claim 1, wherein said annular groove of said female member and said annular groove of said outer collar has at least one hole to communicate with said one of said annular groove and said annular groove of said outer collar and said annular groove of said female member are partially shifted relative to each other, and at least one coupling ball is disposed in said annular space through said at least one hole to movably couple said outer collar with said female member and to prevent said outer collar from falling off from said female member.

3. A pipe coupling according to claim 1, wherein said inner collar has at least one deformable wall portion provided at an end portion thereof and due to application of pressure to said inner collar, said at least one deformable wall portion is deformed outwardly in a radial direction of said inner collar facilitating said inner collar frictional engagement with the peripheral surface of the pipe body when the pipe body is pulled out so as to secure the pipe body to the pipe coupling.

4. A pipe coupling according to claim 3, wherein said at least one deformable wall portion is comprised of at least one longitudinal groove formed to said end portion of the inner collar so as to provide at least one thin wall portion at the bottom of said longitudinal groove, and said thin wall portion is deformed by the pressure radially applied when the pipe body is pulled out.

5. A pipe coupling according to claim 1, wherein said outer collar is mounted to said female member so as to be able to move relative to said female member such that the pipe body can be placed on a tip of said outer collar by the relative movement of said outer collar with regard to said female member when the pipe body is not coaxial with said outer collar, and such that said outer collar absorbs vibration and shock applied to the pipe body jointed to the pipe coupling due to movement of said outer collar relative to the female member.

6. A pipe coupling according to claim 1, wherein said movement-restricting means is formed such that an inner diameter of said outer collar at a female member side of the portion of said outer collar at which said inclined surface is formed is large, and which causes said pressing member to generate a pressing force by said pressing member abutting said inclined surface.

7. A pipe coupling according to claim 6, further comprising alternation means which can alter a position where said pressing member and said inclined surface contact each other.

8. A pipe coupling according to claim 1, wherein said urging member and said inner collar are arranged in that order from a female member side.

9. A pipe coupling according to claim 1, further comprising a seal member provided at an inner peripheral surface of said female member at a position spaced from said urging member to sealingly contact with said inner peripheral surface of said female member and an outer peripheral surface of the pipe body when the pipe body is said female member.

10. A pipe coupling according to claim 9, wherein said sealing means is comprised of at least one annular groove formed at inner peripheral wall surface of said female member and at least one sealing ring which is sealingly disposed in said at least one annular groove.

11. A pipe coupling according to claim 1, wherein said inner collar can be moved from the outside.

12. A pipe coupling according to claim 1, wherein said pressing member comprises a plurality of ball-shaped members.

13. A pipe coupling according to claim 1, wherein a stepped portion is formed at an intermediate portion of an inner peripheral surface of said female member such that a leading end portion of an inserted pipe body contacts said stepped portion.

14. A pipe coupling comprising:

a cylindrical female member;

an outer collar which is cylindrical and which is formed so as to be continuous with said female member, and which has an inclined surface at an inner peripheral surface thereof, said inclined surface being formed such that a diameter thereof at the side of a deep portion within said female member is large;

an inner collar which is cylindrical and which is provided so as to move within said outer collar in an axial direction of said outer collar;

a pressing member, which is supported by said inner collar and provided so as to move together with said inner collar in an axial direction of said inner collar, contacting the inclined surface of said outer collar and pressing an outer peripheral surface of an inserted pipe body, the inclined surface of said outer collar causing said pressing member to be moved in a radial direction thereof when said pressing member moves toward a deep portion within said female member and restricting the movement of said pressing member in the radial direction when said pressing member moves toward an exit; said pressing member is formed into such a shape and made of such a material as to be dug in the surface of said pipe body when a strong force acts in a direction in which said pipe body is pulled out;

an inner urging member disposed between said female member and said inner collar and urging said inner collar toward the exit; and coupling means for movably coupling said outer collar with an end of said female member to allow rotational and pivotal movement of said outer collar relative to said end of said female member said coupling means being comprised of one groove provided in one of said outer collar and said female member, and one protection provided oppositely to said at least one groove on the other of said outer collar and said female, and said one projection is fitted into said one groove to movably couple said outer collar with said female member and to prevent said outer collar from falling off from said female member.

15. A pipe coupling according to claim 14, wherein an end portion of said inner collar in a direction of the exit projects further toward the exit than an end portion of said outer collar in the direction of the exit.

16. A pipe coupling according to claim 14, wherein an end portion of said inner collar is substantially flush with an end portion of said outer collar when said inner collar has moved toward an inside direction of said female member.

17. A pipe coupling according to claim 14, wherein said inner collar has at least one deformable wall portion provided at an end portion thereof and due to application of pressure to said inner collar, said at least one deformable wall portion is deformed outwardly in a radial direction of said inner collar facilitating said inner collar frictional engagement with the peripheral surface of the pipe body when the pipe body is pulled out so as to secure the pipe body to the pipe coupling.

18. A pipe coupling according to claim 17, wherein said said at least one deformable wall portion is comprised of at least one longitudinal groove formed to said end portion of the inner collar so as to provide at least one thin wall portion at the bottom of said longitudinal groove, and said thin wall portion is deformed by the pressure radially applied when the pipe body is pulled out.

19. A pipe coupling according to claim 14, further comprising a sealing means provided at an inner peripheral surface of female member to sealingly contact with said inner peripheral surface of said female member and an outer peripheral surface of the pipe body when the pipe body is inserted into said female member.

20. A pipe coupling according to claim 19, wherein said sealing means is comprised of at least one annular groove formed at inner peripheral wall surface of said female member and at least one sealing ring which is sealingly disposed in said at least one annular groove.

21. A pipe coupling according to claim 14, wherein a stepped portion is formed in at an intermediate portion of an inner peripheral surface of said female member such that a leading end portion of an inserted pipe body contacts said stepped portion.

22. A pipe coupling according to claim 14, further comprising alternation means which can alter a position where said pressing member and said inclined surface contact each other.

23. A pipe coupling according to claim 14, wherein said projection is annular.

24. A pipe coupling according to claim 14, wherein said outer collar is mounted to said female member so as to be able to move relative to said female member such that the pipe body can be placed on a tip of said outer collar by the relative movement of said outer collar with regard to said female member when the pipe body is not coaxial with said outer collar, and such that said outer collar absorbs vibration and shock applied to the pipe body jointed to the pipe coupling due to movement of said outer collar relative to the female member.

* * * * *